Figure 1:
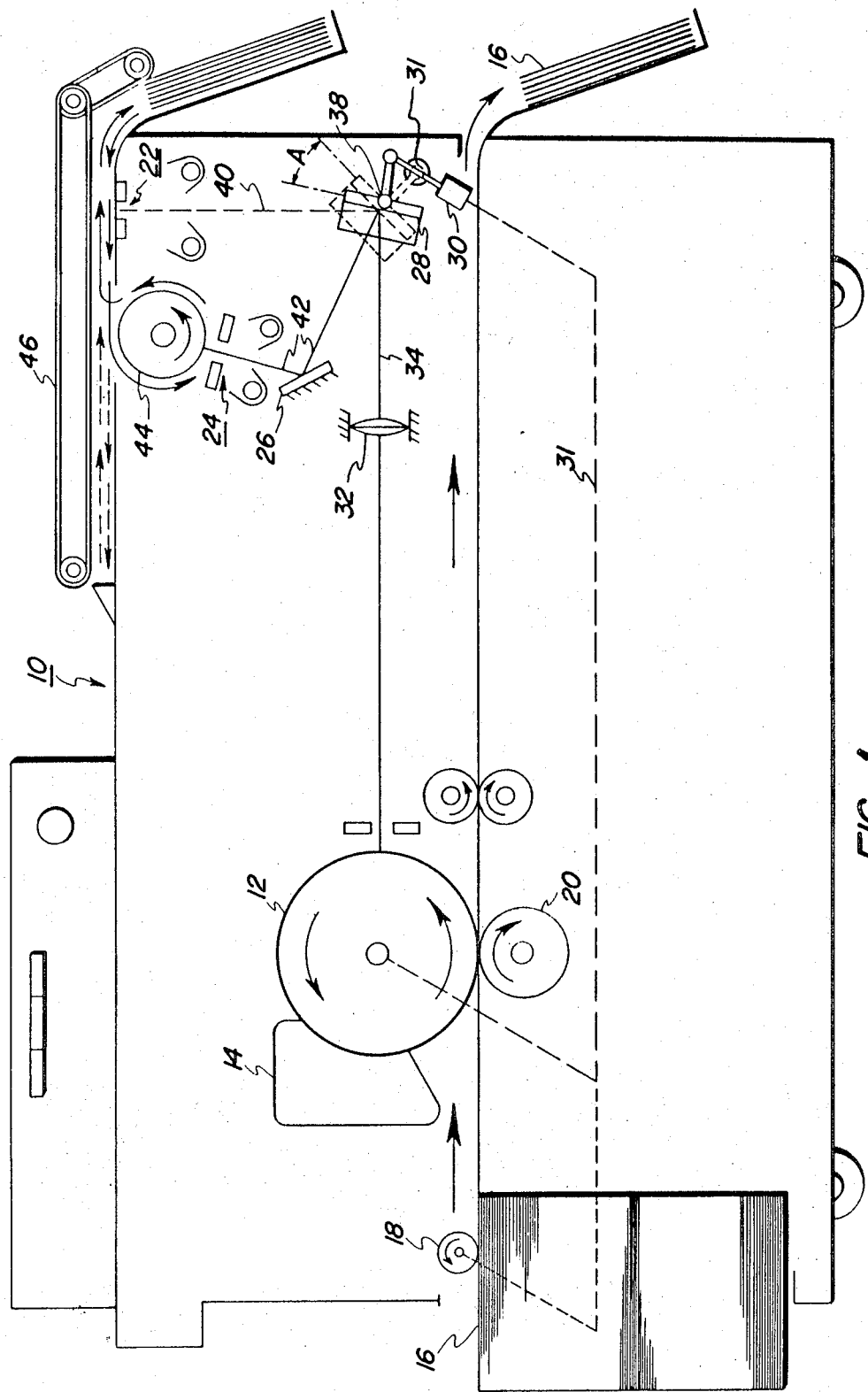

United States Patent [19]
Kelly

[11] 3,844,653
[45] Oct. 29, 1974

[54] ROOF MIRROR COPYING SYSTEM
[75] Inventor: David L. Kelly, Pittsburgh, Pa.
[73] Assignee: Xerox Corporation, Stamford, Conn.
[22] Filed: Oct. 29, 1973
[21] Appl. No.: 410,654

[52] U.S. Cl............ 355/8, 355/24, 355/49, 355/66
[51] Int. Cl. ............................................ G03b 27/70
[58] Field of Search ............ 355/3 R, 8, 11, 23, 24, 355/47–49, 66

[56] References Cited
UNITED STATES PATENTS

| | | | |
|---|---|---|---|
| 2,940,358 | 6/1960 | Rosenthal | 355/66 |
| 3,216,316 | 11/1965 | Brownscombe | 355/49 |
| 3,709,602 | 1/1973 | Satomi | 355/49 |
| 3,740,137 | 6/1973 | Sato | 355/66 |
| 3,775,102 | 11/1973 | Punnett | 355/3 X |

*Primary Examiner*—Richard A. Wintercorn

[57] ABSTRACT

A duplex copying system in which a roof mirror is alternately positioned for alternate document pages to function as a roof mirror and then as a flat mirror for simplex to duplex copying, and also can pivot between two exposure stations as a flat mirror for duplex to duplex copying. The roof mirror movement can be pivotably coordinated with the movement of a photoreceptor and a copy sheet feeder to provide, with a transfer roller, direct duplex electrostatographic copying. This roof mirror is the only moving mirror required in the system and has two relatively small degrees of rotation.

7 Claims, 2 Drawing Figures

ROOF MIRROR COPYING SYSTEM

The present invention relates to an improved apparatus and method for the optical reproduction of both sides of an original document onto a single duplicating imaging surface with a simplified optical arrangement utilizing a roof mirror.

The prior art includes numerous patents and other references, including those cited hereinbelow, relating to imaging systems for electrostatographic apparatus, including apparatus and methods for duplex document copying having various mirror reflective path arrangements. Most of these are considerably more complex in structure and function than the apparatus disclosed herein, or suffer from other comparative disadvantages as will be more apparent from the following discussion. Considering some of this art, all of which is incorporated by reference herein, U.S. Pat. No. 3,079,839 to E. E. Lohner et al is exemplary of duplex/duplex copiers incorporating two different exposure or imaging stations and having different mirror paths providing a different number of reflections and therefore relative reversion of the two images. Shifting mirrors in the optical path of duplex xerographic reproduction apparatus is taught by D. Rubin, U.S. Pat. No. 3,318,212, which provides a 180° flipping mirror assembly with a plane mirror on one side and a roof mirror on the opposite side thereof. C. F. Carlson, U.S. Pat. No. 3,506,347 is a duplex xerographic reproduction apparatus providing a document drum for reversing documents for duplexing while exposing the document on the document drum. Gopal Bhagat et al, U.S. Pat. No. 3,697,170, is exemplary of a number of patents teaching apparatus and methods for duplex copying wherein both sides of a final copy sheet can be reproduced simultaneously from a single photoreceptor drum by transferring one of the images to an image transfer storage member, which can also provide reversal of the image. Various sheet reversal mechanisms are illustrated, for example, in W. A. Drawe et al, U.S. Pat. No. 3,615,129 and M. R. Spear, Jr., U.S. Pat. No. 3,645,615. Other patents illustrating document copying apparatus employing a single optical path and reversal of the document after a first side has been imaged are illustrated in U.S. Pat. Nos. 3,227,444; 2,472,931; and 2,304,273. Duplexing systems in which opposite sides of the document are imaged onto two different photoreceptors is illustrated, for example, by U.S. Pat. Nos. 3,536,398 and 3,580,670 to Gopal Bhagat.

Although the above-cited references indicate extensive and long-standing efforts in the duplexing reproduction art, none of these references, individually or in combination, teach a duplexing apparatus or method in which the same integral roof mirror alternately functions as a roof mirror and as a flat mirror to provide a desired reversal imaging of two different input images through a common lens system onto a photoreceptor by a slight movement of the roof mirror.

A relevant pending prior U.S. application (D72226) is by Joachim Guenther, entitled Duplex Copying System, filed Nov. 16, 1972 as Ser. No. 307,279, and commonly assigned. That application discloses a pivoting flat mirror duplex imaging system, but not a roof mirror.

An exemplary embodiment of the present invention is shown and described hereinbelow as incorporated in an otherwise conventional exemplary xerographic apparatus and process. Accordingly, said xerographic process and apparatus need not be described in detail herein, since various printed publications and patents and publicly used machines are available which teach details of various suitable exemplary electrophotographic structures, materials and functions to those skilled in the art. Some examples are disclosed in the books *Electrophotography* by R. M. Shaffert, and *Xerography and Related Processes* by John H. Dessauer and Harold E. Clark, both first published in 1965 by Focal Press Ltd., London, England; and the numerous patents and other references cited in these books. All of these references are hereby incorporated by reference in this specification.

Figure 2:
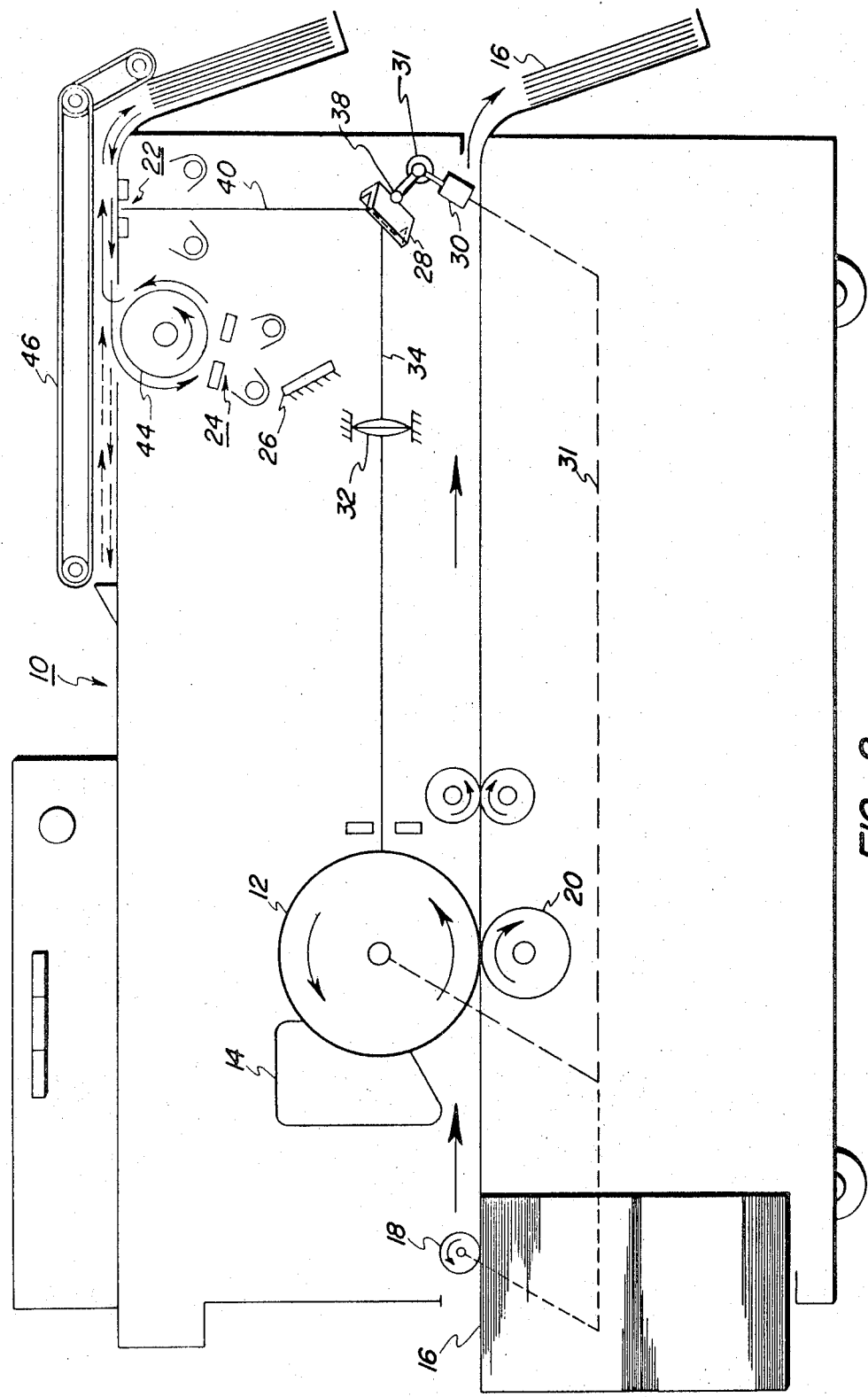

Further objects, features and advantages of the present invention pertain to the particular apparatus, steps and details whereby the above-mentioned aspects of the invention are attached. Accordingly, the invention will be better understood by reference to the following description and to the schematic drawings forming a part thereof, wherein:

FIG. 1 is a schematic side view of an exemplary xerographic duplex copying apparatus in accordance with the present invention, shown in the duplex to duplex copying mode; and FIG. 2 is the apparatus of FIG. 1 shown in the simplex to duplex copying mode.

Referring to FIGS. 1 and 2, there is shown therein an exemplary xerographic optical reproducing apparatus 10 for providing duplex copying of an original document onto a single imaging surface in accordance with the present invention. This apparatus 10 is illustrated here schematically for clarity, and is not to scale, since, as noted above, the individual components thereof may be conventional ones to those skilled in the art and already fully described in detail in the above-cited and other art. Of course, the actual dimensions of the moving roof mirror will depend on its position in the optical paths, the images, etc. Also, in the following discussion the image reversion function of a roof mirror as compared to flat mirror need not be discussed, since this is well known in the art, as is the construction of roof mirrors.

In the exemplary apparatus 10 the imaging surface is a conventional xerographic photoconductor drum 12, with which there will be conventionally associated a developer station 14 and the other well-known xerographic components for charging, development, transfer, cleaning, optical imaging etc. The image is transferable from the drum 12 to a copy sheet 16 fed thereto by conventional copy feed means 18. The copy sheet 16 may be, of course, individual pre-cut sheets as shown here or a continuous web sheet in fan fold, roll feed, etc., which may or may not be subsequently cut or burst. The copy sheet 16 is here fed between the photoconductor drum 12 and an opposing engaging image transfer drum 20 for providing simultaneous image transfer to both sides of the copy sheet in any suitable or conventional manner. (Note the prior art previously cited above for this particular feature).

The arrangement provided by the transfer drum 20 is integrally related to the optical system to be described, in that the simple optical system herein is adapted to selectively provide an image of an original onto the photoreceptor drum 12 which image is "wrong reading" or reverted on the drum 12. Then, alternately, another original image is imaged onto the photoconductor drum 12 as a "right reading" image. The desired relative reversion between these two images is accomplished by changing the image reflections in the image paths, as will be described herein, and the type of reflection change depends here on whether the originals are simplex (one sided) or duplex (two sided) documents.

The wrong reading images on the photoconductor drum 12 may, of course, be directly transferred to the top side of the copy sheet 16. However, the alternate right reading images on the drum 12 are first transferred to the transfer drum 20, (the transfer reverts the image) then transferred from the transfer drum 20 to the backside of the copy sheet 16.

It will be appreciated that for the above-described simultaneous image transfer to both sides of the copy paper that the optical imaging onto the photoreceptor must be coordinated with both the rotation of the photoconductor drum and the movement of the copy sheets. It will also be apparent that the optical arrangement described hereinbelow is advantageous whether or not such a direct and simultaneous duplex copying system employing a transfer drum is utilized.

Referring first to FIG. 1, it may be seen that the apparatus 10 comprises here a first exposure station 22, a second exposure station 24, a first (fixed) flat mirror 26 for the second exposure station 24, and a second (pivotable) roof mirror 28 rotated by a solenoid 30 or other suitable means for alternately viewing either the first or second exposure stations 22 or 24. In both such positions of the second mirror 28 the document image is reflected from the second mirror 28 through a common optical path 34, including a single common lens unit 32, into the same exposure station of the photoconductive drum 12.

In the duplex original mode of FIG. 1 the roof mirror 28 is tilted with respect to the image paths 40 or 42 and 34 so that it functions in both cases as a flat mirror rather than as a roof mirror. That is, the mirror 28 is positioned so that one side of the roof is perpendicular these image paths and is therefor inoperative, while the other side of the roof is positioned in the image paths just as a flat mirror would be.

The second or roof mirror 28 in the duplex original mode of FIG. 1 pivots between its first and second positions in simple rotation about an axis 38 directly adjacent the center of the mirror surface, and perpendicularly the plane of FIG. 1. The required rotation between these two different operating positions of the second mirror 28 is only a limited movement of substantially less than 90° about the axis 38, indicated by the angle A shown here.

Still referring to FIG. 1, the first operating position of the pivotable mirror 28 is illustrated here by the alternate (dashed outline) position of the mirror 28 and its operating lever connected to the solenoid 30, and by the dashed lines representing a first reflective optical path 40. It may be seen that in this first position that the second mirror 28 is optically aligned with the first exposure station 22 and provides a direct, single flat mirror reflection optical path from this first exposure station 22 to the photoconductive drum 12.

When the mirror 28 is pivoted by the solenoid 30 to its second operating position of FIG. 1 through the angle A, i.e., to the indicated position (solid line outline) of the mirror 28, it may be seen that the mirror 28 is no longer aligned with or viewing the first exposure station 22. Instead, the mirror 28 is now optically aligned with the first (fixed) mirror 26 and the two mirrors together provide a second optical path 42 illustrated here in solid lines.

This second optical path 42 is from the second exposure station 24, reflected obtusely through the first mirror 26, then reflected acutely through the second mirror 28 to the photoconductive drum 12. Thus, since the two mirrors 26 and 28 are here both functioning as single plane mirrors, it may be seen that in this position of the mirror 28 that a simple double reflective path is provided between the second exposure station 24 and the photoconductor drum 12 using only the two mirros, one of which (26) is fixed and the other of which (28) is a multiple function mirror, changing its function simply by a slight rotational movement.

The second optical path 42, by virtue of the double reflection, provides relative reversion of a document exposed at the second exposure station 24 relative to document exposure at the first exposure station 22. It will be appreciated, of course, that additional mirrors may be introduced in the first optical path 40 and 42 for additional reflections if required for certain applications. However, the above-described configuration is preferred here, since the second exposure station 24 here is also the station adapted to provide high speed repeat copying of a document. Since the second optical path 42 here is doubly reflective it provides a desired wrong reading image on the photoconductor drum 12 from the second exposure station 24 for direct transfer from the drum to the copy sheet 16.

It will be noted that the first mirror 26 is preferably positioned relatively closely adjacent to the second exposure station 24. The first exposure station 22 and the first mirror 26 are positioned sufficiently spaced apart angularly with relation to the axis of the rotation of the second mirror 28 so that there is no optical interference between the images therefrom. Yet, since this spacing (the angle between the first optical path 40 and the second optical path 42) determines the angle A through which the mirror 28 must rotate, it will be appreciated that the closer the spacing, the less pivotable movement of the mirror will be required, which is highly desirable since the reduction in the movement of the mirror 28 increases the potential speed of operation of the apparatus 10, reduces the inertial forces to which the mirror 28 is subjected, and reduces the power and movement requirements of the solenoid 30.

The second exposure station 24 here includes a rotatable document carrying drum 44, and it may be seen that the exposure of a document occurs on this document drum 44 as the document is being carried on and rotated by the document drum. The document may be held in this document drum 44 by a vacuum or sheet gripping means, mating rollers or other suitable retention devices, examples of which will be found in the above-cited references.

The document drum 44 provides at least three functions here. First of all it provides a document reversal means for turning a document over and providing for the exposure at the second exposure station 24 of a side of the document opposite from the side exposed in the first exposure station 22. This is needed for duplex originals. Secondly, the document drum 44 provides a direction of motion of the document at the second exposure station which is opposite from the direction of motion at the first exposure station for proper scanning direction. Thirdly, by retaining the document on the document drum 44 for more than one cycle of rotation past the exposure slit of the second exposure station 24 multiple copies can be rapidly made of either simplex or duplex originals.

Both of the exposure stations 22 and 24 shown here are of the type wherein the document is moved past a stationary illuminated exposure slit, and both of the mirrors herein are held stationary during the document exposure until the entire document has passed the exposure slit. However, it will be appreciated that the described optical arrangement may also be utilized in a scanning exposure type of apparatus in which the document is stationary at the exposure station, and the exposure slit, illuminator, and viewing mirror are moved instead to scan the document for exposure. In a document scanning system, the called-for different positions of the roof mirror 28, instead of being fixed positions, can be the limited scanning angle positions required for the imaging stations. These scanning angles cannot, of course, overlap one another and the mirror 28 would still have to be shifted as described herein between the two distinct scanning angles or arcs for the two different exposure stations.

An exemplary schematic belt feed structure 46 is illustrated herein. For duplex original copying the movement of the documents is from the document tray across the first exposure station 22, and then onto, and returning from, the document drum 44. This path is illustrated by solid arrows here. The apparatus 10 is adapted to provide all desired modes of duplication. Thus, one alternate document feed path, for simplex original imaging across only the first exposure station 22, is illustrated by the dashed arrows under the belt feed 46.

The above-described components of the optical system are so arranged that the first optical path 40 has the same optical path length as the second optical path 42. This is highly desirable since it eliminates any refocusing of the single common lens system 32 for the two different exposure stations. Thus, the only movement required in the entire optical system for changing the imaging between exposure stations is the slight rotation of the mirror 28. This equal path length is readily accomplished by the present arrangement, even though the second optical path 42 is folded through its reflection on the first mirror 26, by positioning the document drum 44 closer to the second mirror 28 than the first exposure station is, and by locating the mirror 26 relatively closely adjacent the direct path between the second exposure station and the mirror 28, (utilizing an obtuse image reflection).

Further, the first exposure station 22 is here a horizontal platen on the top surface of the apparatus 10, whereas the document drum 44 and its second exposure station 24 is desirably mounted internally of the apparatus 10 below this top surface, and therefore closer to the mirror 28.

As previously mentioned, conventional and suitable means are, of course, provided to coordinate the activation of the solenoid 30 for pivoting the second mirror 28 in coordination with the rotation of the drum 12 and the actuation of the copy sheet feed means 18 in order to feed the copy sheet 16 in proper sequence and registration for the imaging thereon of the optical images from the respective exposure stations. This is illustrated by the dashed connecting line 31 herein, and suitable apparatus details therefor are discussed in the above-cited and other references.

Briefly describing the functioning of the apparatus 10 for single pass duplex/duplex copying, as in FIG. 1, the individual document to be reproduced is fed into the apparatus 10 from an appropriate document tray through the belt feed 46 here, short edge first. This causes the document to be first passed over, and scanned by, the first exposure station 22. At this point, the second mirror 28 is tilted into its first position providing the first optical path 40 from the first exposure station 22 to the photoconductor drum 12. Thus, the only operational optics are the single mirror 28 and the single lens system 32, and the image on the photoreceptor is right reading. The preferred orientation of the document, as seen from the machine, is left side inboard with the document being scanned from right to left with the top being the leading edge.

As the document continues further under the action of the belt feed 46 or other suitable document feeder, it is next fed onto the document drum 44, secured thereto, and rotated around the document drum 44 past the second exposure station 24. Thus, the opposite side of the document is now exposed. The document has been reversed and the second side thereof is being viewed in the second exposure station 24. The bottom of the document drum 44, and thus the document, at the second exposure station 24 is moving in a direction opposite to that with which the document was fed past the first exposure station 22. Also, at this point the second mirror 28 has been shifted to provide the second optical path 42 through the first mirror 26, thus the operational optics are now two mirrors rather than one, and the image on the photoreceptor is therefore now wrong reading. The document orientation is now right side inboard and the scanning direction of the document is left to right with the top still being the leading edge. This operation provides the proper sequence and orientation of latent images on the photoconductor drum 12 for development and transfer (with the transfer drum 20) of permanent visual images onto the copy sheet 16 in the same position and orientation as that of the document being copied.

Referring now additionally to FIG. 2, the operation of the same apparatus 10 for simplex to duplex copying will be described. It may be seen that FIG. 2 is basically the same as FIG. 1 except for the important distinction that the roof mirror 28 has been rotated about its apex line (the central line of intersection of the two 90° intersecting plane mirror surfaces forming the roof mirror) so that both faces of the roof mirror are now evenly operatively disposed in the optical path. That is, the entire roof mirror 28 is now pivoted into a position where it is functioning as a true roof mirror in the first optical path 40, i.e. providing a roof mirror reflection (rather than a flat mirror reflection) of the image of an original on the first exposure station 22 to the photoreceptor 12. This reflection is through the same lens path 34. As is well known in the optical art, a roof mirror provides the same image reversion as would two separate plane mirrors reflecting the entire image in sequence. However, the difference is that a roof mirror requires only half the reflective surface area and lateral dimensions of two separate plane mirrors. The roof mirror has its apex line centered on the image area and only half of the image area is reflected by each half of the roof. That is, the entering image beam is evenly split between the two reflective surfaces of the roof. Thus the roof mirror has a smaller mass, rotational inertia and angular momentum than two separate mirrors. A roof mirror does, however, require a higher degree of mirror precision. Since the beam is split the roof angle of intersection must be maintained within a few seconds of 90° to prevent a double image from being formed, and the apex line of intersection must be effectively invisible. Thus, the disclosed system, which requires only a small and central (small radius) mirror movement, is desirable for reducing dynamic distortions of this roof mirror precision which could occur from rapid large radius and/or large angle movements of the mirror.

Various cam, track, or lever pivoting mechanisms, schematically exemplified by a second solenoid 31 here, may be utilized for this integral pivoting of the roof mirror 28 from a flat to a roof mirror orientation. The mirror 28 may also be shifted slightly as well as rotated, if desired, for maintaining a constant optical path length.

In simplex to duplex copying the originals do not have to be turned over, and thus are desirably sequentially imaged at the same imaging station. Here the first simplex document page to be copied is imaged from the first exposure (imaging) station 22 onto the photoreceptor with the roof mirror 28 in its flat mirror position of FIG. 1, (the dashed outline position). This gives a right reading image of the first simplex document page on the photoreceptor, for transfer as a wrong reading (printable) image to the transfer roller. The second simplex document page is then imaged at the same first exposure station 22, but for this page the mirror 28 is first turned 45° to the roof mirror position of FIG. 2. Thus, this second simplex document page is imaged onto the photoreceptor as a wrong reading (directly printable) image through the roof mirror 28. This mirror 28 switching sequence is repeated for each subsequent simplex document page.

Only an approximately 45° mirror movement is required for switching the integral roof mirror 28 from a flat to roof function in this system, rather than the 180° rotation of two different mirrors about the opposite ends of a rotating arm, as in the cited prior art systems. Thus it may be seen that the stresses on the mirror 28 from high mirror accelerations are much less in the present system. This allows much more rapid operation with less danger of mirror vibration, distortion or damage. A monolithic metal substrate may be utilized for the two roof mirror surfaces.

To summarize, it may be seen that with the disclosed system that simplex originals may be copied in rapid sequence at a single imaging station, and that the required alternate page changes in the reflective path to make true duplex copies therefrom with proper conventional duplex image orientation, e.g. for conventional edge binding, are made by the pivoting of a single moving roof mirror by only approximately 45° about a central axis, between a roof mirror position and a position using one side of the roof mirror as a flat mirror. Further, as previously described, this same single moving roof mirror can be pivoted about a different axis for duplex to duplex copying by pivoting its view between two different exposure stations.

In conclusion, it may be seen that by the above-described cooperative combination and method of operation that duplex copying can be provided with a simple, inexpensive and reliable system requiring less optical components and only slight movement of one component in the optical path. Further, these components may be conventional and relatively non-critical.

The exemplary embodiment described herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In optical reproducing apparatus providing duplex copying of an original document onto a single imaging surface, the improvement comprising:
   an imaging surface;
   a first exposure station for exposing a side of said original document;
   an integrally pivotably mounted roof mirror comprising two flat mirror surfaces, said roof mirror being pivotable into a first position in which it is in optical alignment with said first exposure station to provide a first, roof mirror, reflective optical path utilizing both said two flat mirror surfaces,
   said first reflective optical path extending through said roof mirror from said first exposure station to said imaging surface;
   and means for pivoting said roof mirror out of said first position into a second position,
   said roof mirror in said second position having only one of said two flat mirror surfaces in optical alignment with said first exposure station and providing through said one flat mirror surface a second, flat mirror, reflective optical path from said first exposure station to said imaging surface,
   said second reflective optical path providing, relative to said first reflective optical path, relative reversion on said imaging surface of an image from said first exposure station.

2. The apparatus of claim 1 wherein said first and second reflective optical paths are substantially identical in length and wherein there is a common fixed axis lens system therefor.

3. The apparatus of claim 1 wherein said imaging surface is a moving xerographic photoconductive surface and said means for pivoting said roof mirror are coordinated with the movement of said surface, and wherein copy feed means are provided for feeding a copy sheet into engagement with said photoconductive surface.

4. The apparatus of claim 1 wherein said roof mirror is pivotably mounted for rotation about a central axis and said first and second positions of said roof mirror are approximately 45 degrees of rotation apart.

5. The apparatus of claim 2 wherein said roof mirror is pivotably mounted for rotation about a central axis and said first and second positions of said roof mirror are approximately 45 degrees of rotation apart.

6. The apparatus of claim 1 further including:
   a second exposure station for said document spaced from said first exposure station;
   document reversal means for exposing in said second exposure station the opposite side of a document from said first exposure station;
   wherein said roof mirror is pivotable into a third position in which it is optically aligned with said second exposure station to provide through said roof mirror a third reflective optical path from said second exposure station to said imaging surface.

7. The apparatus of claim 6 wherein a fixed plane mirror is positioned in the optical path between said second exposure station and said roof mirror.

* * * * *